Nov. 7, 1972

L. E. FESSLER 3,702,236

CATALYTIC CONVERTER

Filed Feb. 19, 1971

INVENTOR:
LeRoy E. Fessler

BY:
*James R. Hoatson, Jr.*
*Ronald H. Hausch*

ATTORNEYS

United States Patent Office 3,702,236
Patented Nov. 7, 1972

3,702,236
CATALYTIC CONVERTER
Leroy E. Fessler, Bartlett, Ill., assignor to Universal Oil Products Company, Des Plaines, Ill.
Filed Feb. 19, 1971, Ser. No. 116,773
Int. Cl. F01n 3/14; B01j 9/04
U.S. Cl. 23—288 F                                6 Claims

ABSTRACT OF THE DISCLOSURE

A catalytic converter for treating an engine exhaust stream which embodies a pair of passageways disposed along the free side of the catalyst compartment within an outer housing. The passageways communicate with manifold compartments formed between the housing and the perforated partitions which form the catalyst compartment, over substantially the total length of each passageway.

---

The present invention is directed to an improved catalytic converter for use in the catalytic conversion of exhaust gas streams and more particularly to a converter which incorporates a pair of adjacent passageways which control flow through manifold compartments.

The desirability of removing or converting the noxious compounds of vehicular exhaust gases has been generally well established. The unavoidable incomplete combustion of hydrocarbon fuel by a gasoline or diesel engine results in the generation of substantial quantities of unburned hydrocarbons, oxides of nitrogen, and other undesirable products, which as waste products discharge into the atmosphere through the exhaust line. With the ever-increasing concentration of automobiles, particularly in urban areas, the resulting accumulation of these undesirable products in the atmosphere may reach high proportions. These combustion products are known to react with atmospheric gases to produce smog or pollution. Such waste products include, for example, saturated and unsaturated hydrocarbons, carbon monoxide, aromatics, partially oxygenated hydrocarbons such as aldehydes, ketones, alcohols and acids, as well as oxides of nitrogen and sulfur. In an ideal catalytic operation, hot gases issuing from a motor exhaust manifold are passed through a catalytic compartment or conversion zone maintained within a converter, so as to effect a more or less complete conversion of carbon monoxide, unburned hydrocarbons, as well as the oxides of nitrogen to a harmless state.

It is generally desirous to design a converter to take the form of a conventional muffler for an automobile, which is generally of a flat rectangular or oval form. To conform to this size and shape, prior art converters had to utilize catalyst compartments which were very thin, and for this reason the catalyst compartment developed hot spots and the exhaust gases by-passed the catalyst particles very easily. Also, because of the short space available to include both the distribution and collection manifolds and the catalyst compartment, the manifolds, by necessity, were made generally small in a cross sectional area which resulted in undesirable large engine back pressures.

It is thus the principal object of this invention to provide for a catalytic converter which may be utilized on the underside of the automobile and which has a catalyst compartment which may be constructed of sufficient thickness to prevent hot spots from developing or to prevent by-passing of exhaust gases.

Another object of this invention is to provide a catalytic converter which has collection and distribution manifolds of sufficient cross sectional area to prevent high engine back pressures from developing.

Another object of this invention is to provide a catalytic converter which distributes the exhaust gases through the catalytic compartment in such a manner to prevent hot spots from developing therein.

Still another object of this invention is to provide a catalytic converter construction that will not fail due to temperature fluctuations in the converter.

In one of its many broad aspects, the present invention provides for a catalytic converter for treating engine exhaust gas, which comprises in combination; (a) an outer housing; (b) a first pair of perforated partitions in said housing, said partitions being spaced in relation to said outer housing to form a first manifold compartment between the housing and one partition, a second manifold compartment between the housing and the other partition, and a first catalyst compartment between the perforated partitions, said catalyst compartment having a free side spaced from the housing; (c) a first passageway disposed along the free side of the catalyst compartment, said first passageway communicating with one of the manifold compartments over substantially the total length of said first passageway; (d) a second passageway disposed along the free side of the catalyst compartment and adjacent to the first passageway, said second passageway communicating with the other manifold compartment over substantially the total length of the second passageway; (e) inlet means into one passageway for introducing untreated exhaust gases therein; and, (f) outlet means from the other passageway for discharging treated exhaust gases therefrom. In a preferred embodiment, the passageways have a common wall member which may be sloped in a manner to control the flow of the exhaust gases through the manifold compartments.

In one embodiment, there is provided a second pair of perforated partitions disposed in substantially the same planes as the first pair and spaced in relation to the outer housing to form a third manifold compartment between the housing and one partition, a fourth manifold compartment between the housing and the other partition, and a second catalyst compartment between the second pair of partitions. In this embodiment, the second catalyst compartment will have a free side spaced from and coextensive with the free side of the first catalyst compartment, and the free side of the second catalyst compartment will be disposed along the first and second passageways. The first passageway will communicate with one of the manifold compartments formed by the second pair of partitions over substantially the total length thereof, and the second passageway will communicate with the other manifold compartment formed by the second pair of partitions over substantially the total length of the second passageway. The design and construction of the present improved converter, as well as other advantageous features in connection therewith, are better set forth and explained by reference to the accompanying diagrammatic drawing and the following description thereof:

Figure 1:
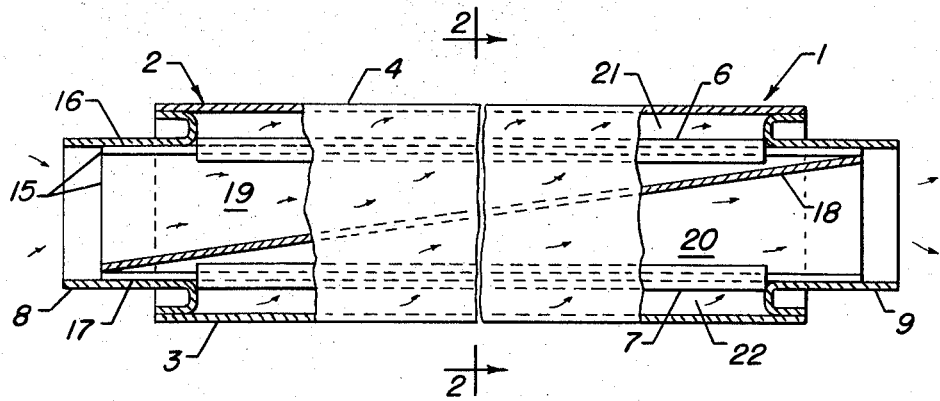
FIG. 1 is a longitudinal elevational view shown partially in section of one embodiment of the converter of this invention.
Figure 2:
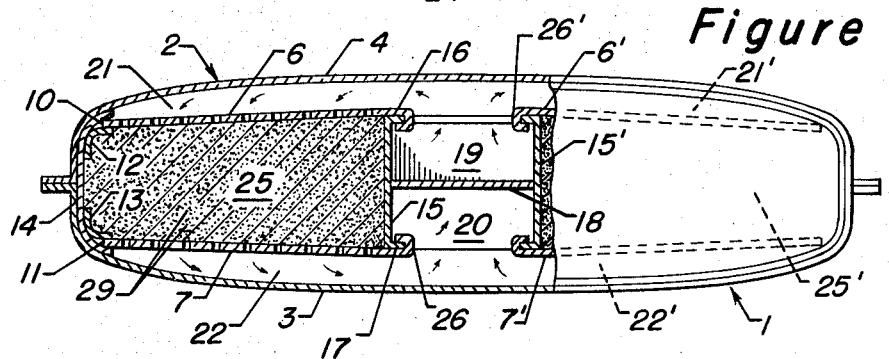
FIG. 2 is a cross sectional view of the embodiment of FIG. 1 as taken along section line 2—2 of FIG. 1.

Referring now to FIGS. 1 and 2 in the drawing there is shown a converter 1 which is comprised of an outer housing 2 formed by two longitudinal sections 3 and 4 and by end sections 8 and 9. Within housing 2 there is disposed a first pair of perforated partitions 6 and 7 which is spaced in relation to the outer housing 2 to form a first manifold compartment 21 and a second manifold compartment 22 between the housing and the partitions. A first catalyst compartment 25 is formed between the perforated partitions 6 and 7. Also included in the embodiment of FIGS. 1 and 2 is a second pair of perforated partitions 6' and 7'. These partitions are disposed in substantially the same planes as the first pair 6 and 7 and are spaced in relation to outer housing 2 to form a third manifold compartment 21' and a fourth manifold compartment 22' between the partitions and the housing, and a second catalyst compartment 25' between the partitions. Partitions 6, 7 and 6', 7' have free sides 26 and 26' respectively which are spaced from the housing and which are spaced from each other and coextensive with each other. Wall members 15 and 15' connect to the free sides of the perforate partitions to enclose the catalyst compartments. A first passageway 19 is formed by wall member 15 of catalyst compartment 25 and wall member 15' of the catalyst compartment 25' and by an imperforate partition 18. A second passageway 20 is located along side catalyst compartment 25 and catalyst compartment 25' and is formed by wall member 15 and wall member 15' and imperforate partition 18. It is noted that partition 18 is a common wall member of both the first passageway 19 and the second passageway 20 and may, in fact, act as a temperature equalizer. This should not be considered limiting upon the present improvement; however, by utilizing a common wall member I have found that the particular converter is constructed with greater ease. The passageway 19 communicates with manifold compartments 21 and 21' over substantially the total length of the passageway 19 while passageway 20 communicates with manifold compartments 22 and 22' over substantially the total length of the second passageway 20.

It is noted that the type of connections between the perforated partitions 6, 6', 7, and 7' and wall members 15 and 15' and to the sides of the housing 2 are such that the perforated partitions are permitted to expand freely without any detrimental effects on the total structure. In other words, the perforated partitions 6 and 7 are shown to be bent around the ends 16 and 17 of wall member 15 and not permanently affixed thereto. Thus, the perforated plates are permitted to slide in relationship to the wall members 15 and 15'. Wall members 15 and 15' may be connected and sealed to partition 18 using conventional welding techniques. In turn, wall members 15 and 15' may be supported at both ends of the housing via end sections 8 and 9 as shown in FIG. 1 but are preferably fixed only to one end section, so as to allow longitudinal expansion. Furthermore, it is noted that the outer ends 10 and 11 of partitions 6 and 7 are supported in a slidable manner via angles 12 and 13 and channel 14 to housing 2. Although not shown the screens or perforate partitions 6 and 7 are preferably attached to these channels and angles at only one point thereof, the longitudinal midpoint. From this attach point, the partitions are free to grow both longitudinally and transversely. Of course, although the details are not shown, partitions 6' and 7' are supported and attached within housing 2 in a like manner. Thus, a structure is provided that will accept differing amounts of thermal expansion by allowing the individual components the freedom to expand as required, thereby eliminating warping and buckling normally associated with a rigid structure.

Suitable transition connectors may be utilized to attach the end sections 8 and 9 to the existing exhaust system. It is noted that the common wall partition 18 is sloped so that the passageways 19 and 20 are of changing cross sectional area in the direction of flow into and out of the converter 1. By incorporating passageways of changing cross section such as illustrated in FIG. 1, for the distribution and collection of exhaust gases into and out of the manifold compartments 21, 21', 22 and 22', the adverse effects of the velocity head of the exhaust stream upon the catalyst within the catalyst compartments 25 and 25' are minimized. For example, if end section 8 is assumed to be the inlet to converter 1, the reduction in the cross sectional area of the inlet passageway 19, in the direction of flow together with the reverse situation in the gas collection or outlet passageway 20, provides for a substantially uniform flow or driving force at any point of introductions into the manifold compartments 21 and 21'.

Of course, within the catalyst compartments 25 and 25' is located catalyst material 29 to be utilized in the converter. With regard to the particular type of catalyst material to be used, it is not intended to limit this improved type of catalytic converter to any one particular type of catalyst, inasmuch as there are various known effective and efficient catalyst compositions. Suitable catalysts include the metal and some metal oxides of Groups I, V, VI, VII and VIII of the Periodic Table, particularly chromium, copper, nickel and platinum. These components may be used singly or in combinations of two or more, etc., and will generally be composited with an inorganic refractory support material, such as alumina, silica-alumina, silica-alumina-zirconia, silica-thoria, silica-boria, and the like. Of course, many other catalysts may be utilized in conjunction with the present design.

In the operation of the converter, the exhaust gases issuing from the exhaust manifold of the automobile engine are directed into the converter through end section 8 as shown by the arrows of FIG. 1. If called for, oxygen may be added to such gases by conventional means. The gases are then directed through the tapered passageway 19 where the high gas velocity eventually develops into a fairly uniform pressure head at the introduction to each manifold compartment 21 and 21'. The gases then flow through perforations of the perforate plate sections 6 and 6' into the catalyst compartments 25 and 25'. The unburned components in the exhaust gases are then converted to form generally harmless components under the influence of the catalyst therein. After conversion, the gases are passed through perforate plate sections 7 and 7' into the manifold compartments 22 and 22' from where they flow to passageway 20. Because of the tapered passageway 20, the effect of the high pressure head at the downstream end of the converter is reduced and there is flow uniformity in a resulting highly efficient converter.

Because passageways 19 and 20 are located adjacent to the catalyst compartments 25 and 25', it is possible to utilize a catalyst compartment of more substantial depth than would be otherwise possible. In other words, prior art schemes have reduced the velocity head of incoming gases in the distribution and collection manifolds directly contacting the catalyst compartment. To accomplish this, the manifold sections adjacent to perforated partitions had to have considerable depth or consequently considerable back pressure would adversely affect the operation of the automotive engine. To accomplish this in a limited space, the beds of catalysts had to be made of thinner cross sectional areas. Such thin beds have had tendencies to develop hot spots and to permit by-passing of exhaust gases through portions of the bed. The present invention permits the use of a thicker catalyst bed and the height of the distribution and collection manifolds are minimized, since the velocity head of incoming exhaust gases is reduced in passageway 19 to a fairly uniform pressure head prior to introduction into the manifold sections 21 and 22. Furthermore, the introduction of exhaust gases into the manifold sections is accomplished along the entire length of the passageway 19 thus providing sufficient area with minimum depth.

Figure 3:
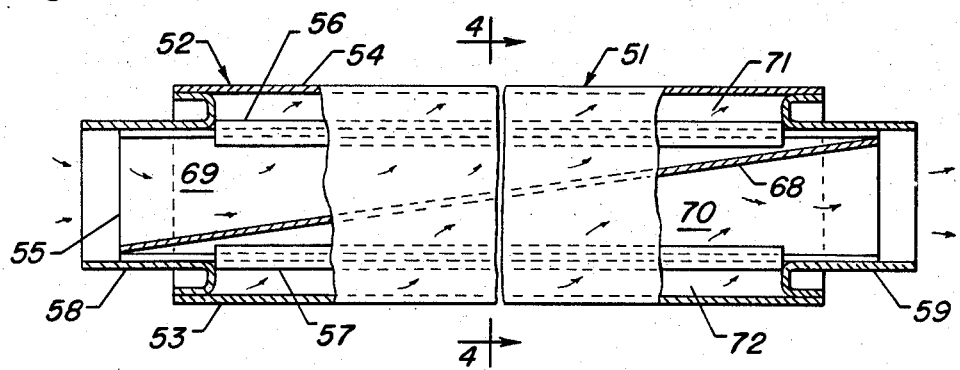
FIG. 3 is a longitudinal area shown partially in section of an alternate embodiment of the converter of this invention.
Figure 4:
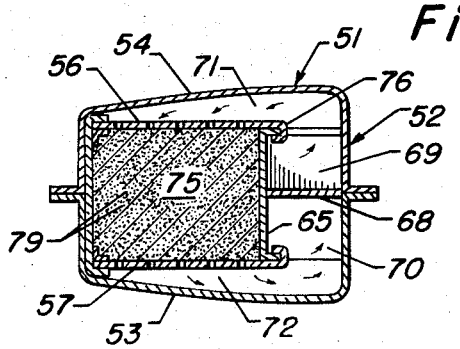
FIG. 4 is a cross sectional view of the embodiment of FIG. 3 as taken along section line 4—4 of FIG. 3.

Reference is no made to FIGS. 3 and 4 of the drawing where there is shown an alternate embodiment of the present invention. Shown is the converter 51 which is comprised of an outer shell or housing 52 comprising longitudinal sections 53 and 54 and end sections 58 and 59. In housing 52 there is disposed a pair of perforate partitions 56 and 57 which is spaced in relationship to the outer housing to form a first manifold compartment 71 between the housing 52 and partition 56 and a second manifold compartment 72 between the housing 52 and the other partition 57. Also formed by the partitions 56 and 57 is a catalyst compartment 75. The catalyst compartment 75 has a free side 76 spaced from the housing. Along the free side 76 of the catalyst compartment 75 there is disposed a first passageway 69 which is formed by a wall member 65 of the catalyst compartment and a partition 68 disposed between the housing 52 and wall 65. Passageway 69 communicates with manifold 71 over substantially the total length of the passageway 69. In a like manner a second passageway 70 is disposed along the free side 76 of the catalyst compartment and adjacent to the first passageway 69. Again, the second passageway 70 communicates with the other manifold compartment 72 over the entire length of the second passageway 70. The embodiment of FIGS. 3 and 4 is shown to illustrate the present invention in a form where only one pair of perforate partitions are utilized in the outer housing. Actually, the embodiment of FIGS. 3 and 4 presents substantially the same construction as that of FIGS. 1 and 2 and subsequently the same advantages. On the other hand, the converter 51 may be utilized in a situation where a long narrow converter is desirous. It is noted that as was the case in the embodiment of FIGS. 1 and 2, partition 68 is preferably sloped to aid in establishing a uniform pressure head into manifold component 71. As was the case in the embodiment of FIGS. 1 and 2, catalyst material 79 would be provided in the catalyst compartment 75.

From the foregoing description, it is seen that the particular converter of the present invention provides a means whereby the total reactor or converter thickness may be minimized and yet contain a bed of substantial thickness to prevent by-passing and hot spots from developing. It also presents a design which may utilize construction techniques of slidable or expansible nature so to eliminate temperature stresses within the converter. It is noted that in both the embodiments of FIGS. 1 and 2 and of 3 and 4 the direction of flow through the catalyst compartment is shown to be downward. Downward flow is generally considered the preferred direction of flow through a catalyst compartment for it prevents floating of the catalyst particles within the converter which may lead to attrition and catalyst breakage. This generally downward flow, however, should not be considered limiting on this present improvement or on the other hand an upward transverse flow may be considered to be within the scope of the present invention. The particular shape of the converters shown in the drawing should not be limiting on this present invention for although the oval shape does prevent most flexing of components within the converter a rectangular shape may be utilized and still fall into the scope of the invention disclosed.

It is desirable that the components of the converter be made of a light weight relatively thin gauge material, whether of ordinary steel or an alloy, such that the assembly is relatively light weight. Of course, the material used should also be of a character that is able to withstand the high temperatures resulting from the operation of the converter. It is also noted that in some instances the catalyst compartment which is formed by the perforate partitions may be reinforced with stiffening members or rib sections. Such construction should still fall within the scope of this present improvement, although by utilizing two pairs of perforate partitions, as is done in the embodiment of FIGS. 1 and 2, the need for such reinforcing members is minimized.

It is also considered within the scope of this present improved design to provide for a covering of all or only a portion of the outer walls of the converter with a suitable insulation material, such as asbestos, mineral wool, or the like, in order to maintain the maximum amount of heat within the catalyst compartment. Also considered within the scope of this invention, is the provision for plug holes, for access to the catalyst compartments. It may well be understood that various minor modifications in design and or location of the various portions of the converter of this invention may be made without diverting from the scope of the invention. For example, there may be a variation in the shape and spacing of the various partitions from that as indicated on the drawing, or in locating and designing the outlet conduits and inlet conduits. Perforations for perforate partitions of course will be sized in relation to the size of the catalyst material maintained within the converter. The physical shape of the catalyst material may be such that they are in the form of spheres, cylinders, or pellets typically having a dimension of $1/16$ to $1/4$ inch although particles of larger or smaller dimensions may be employed where desirable. Mixed sizes of catalysts may also be well utilized as a means to provide for a low temperature catalytic process. Also, the catalytic material may be in the form of the impregnated fibers which in turn may be placed in a mat-like bed arrangement. It is also contemplated that the catalytic material be formed into a rigid shape corresponding to that of the compartments, e.g., bonding subdivided particles into a desired form with the bonded material.

I claim as my invention:
1. A catalytic converter comprising in combination:
 (a) an outer housing:
 (b) a first pair of perforated partitions within and extending longitudinally substantially from one end to the other end of said housing, said partitions being joined by an imperforate end wall at their free ends within the housing and being spaced in relation to said outer housing to form a first manifold compartment between the housing and one partition, a second manifold compartment between the housing and the other partition, and a first catalyst compartment between the perforated partitions, said imperforate end wall forming a wall of said catalyst compartment spaced from the housing;
 (c) a first passageway disposed along said wall of the catalyst compartment, said first passageway communicating with one of the manifold compartments over substantially the total length of said first passageway;
 (d) a second passageway disposed along said wall of the catalyst compartment and adjacent to the first passageway, said second passageway communicating with the other manifold compartment over substantially the total length of the second passageway;
 (e) inlet means into one passageway for introducing untreated exhaust gases therein; and,
 (f) outlet means from the other passageway for discharging treated exhaust gases therefrom.

2. The converter of claim 1 further characterized in that said passageways have a common wall member attached to said wall of the catalyst compartment.

3. The converter of claim 2 further characterized in that said common wall member is sloped upwardly from said inlet means to said outlet means.

4. The converter of claim 1 further characterized in that there is provided a second pair of perforated partitions in said housing disposed in substantially the same planes as the first pair and spaced in relation to the outer housing to form a third manifold compartment between the housing and one partition, a fourth manifold compartment between the housing and the other partition, and a second catalyst compartment between said second pair of partitions, said second catalyst compartment having an imperforate end wall joining said second pair of partitions and spaced from and coextensive with said wall of the first catalyst compartment, and further characterized in that the wall of said second catalyst compartment is disposed along the first and second passageways, and in that said first passageway communicates with one of the manifold compartments formed by the second pair of partitions over substantially the total length of the first passageway, and in that said second passageway communicates with the other manifold compartment formed by the second pair of partitions over substantially the total length of the second passageway.

5. The converter of claim 4 further characterized in that said passageways have a common wall member.

6. The converter of claim 5 further characterized in that said common wall member is sloped upwardly from said inlet means to said outlet means.

References Cited

UNITED STATES PATENTS

| | | | |
|---|---|---|---|
| 1,522,111 | 1/1925 | Franck-Philipson | 60—299 X |
| 2,898,202 | 8/1959 | Houdny et al. | 23—288 F |
| 3,169,836 | 2/1965 | Davis | 23—288 F |
| 3,172,738 | 3/1965 | Houdny | 23—288 F |
| 3,186,807 | 6/1965 | Bolek | 23—288 F |
| 3,413,096 | 11/1968 | Britt | 23—288 F |
| 3,434,806 | 3/1969 | De Rycke et al. | 23—288 F |
| 3,598,540 | 8/1971 | Chase | 23—288 F |

FOREIGN PATENTS

| | | | |
|---|---|---|---|
| 1,316,139 | 2/1962 | France | 23—288 F |

BARRY S. RICHMAN, Primary Examiner

U.S. Cl. X.R.

23—2 E; 55—DIG. 30